J. M. ANDERSEN.
CONTROLLING DEVICE.
APPLICATION FILED APR. 29, 1914.

1,165,935.

Patented Dec. 28, 1915.
2 SHEETS—SHEET 1.

Witnesses:
Ernest A. Telfer
J. Murphy

Inventor:
Johan M. Andersen
by Jas. H. Churchill
atty.

J. M. ANDERSEN.
CONTROLLING DEVICE.
APPLICATION FILED APR. 29, 1914.

1,165,935.

Patented Dec. 28, 1915.
2 SHEETS—SHEET 2.

Witnesses:
Ernest A. Telfer
J. Murphy

Inventor:
Johan M. Andersen
by Jas. H. Churchill
Atty.

COLUMBIA PLANOGRAPH CO., WASHINGTON, D. C.

UNITED STATES PATENT OFFICE.

JOHAN M. ANDERSEN, OF BOSTON, MASSACHUSETTS, ASSIGNOR TO ALBERT AND J. M. ANDERSON MANUFACTURING COMPANY, OF BOSTON, MASSACHUSETTS, A CORPORATION OF MAINE.

CONTROLLING DEVICE.

1,165,935.  Specification of Letters Patent.  Patented Dec. 28, 1915.

Application filed April 29, 1914. Serial No. 835,325.

*To all whom it may concern:*

Be it known that I, JOHAN M. ANDERSEN, a citizen of the United States, residing in Boston, county of Suffolk, and State of Massachusetts, have invented an Improvement in Controlling Devices, of which the following description, in connection with the accompanying drawings, is a specification, like characters on the drawings representing like parts.

This invention relates to a controlling device, and has for its object to provide a device which is capable of being moved into one position substantially in an instant, but which is delayed in its movement into another position a predetermined length of time.

The invention is capable of being employed for controlling the flow of gas, water, electricity or the like, and in the present instance is shown as embodied in an electric circuit controller, which is manually operated to close the circuit and which is automatically operated to open the circuit a predetermined length of time after it has been closed.

These and other features of this invention will be pointed out in the claims at the end of this specification.

Figure 1:
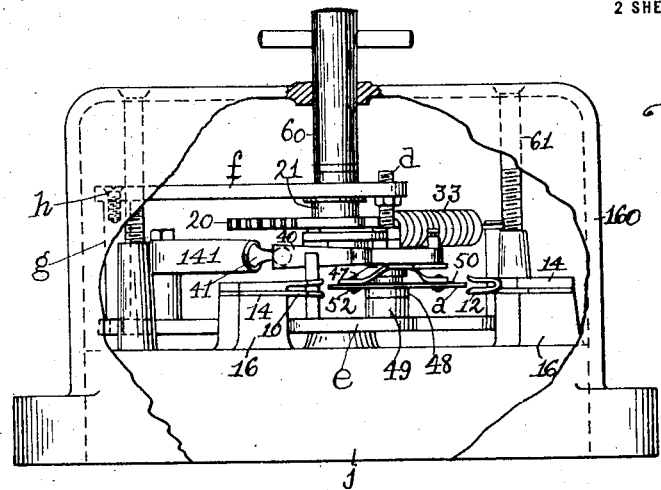
Figure 2:
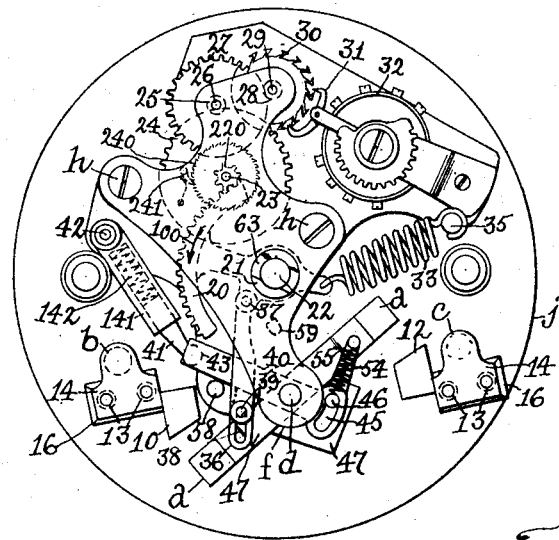
Figure 6:
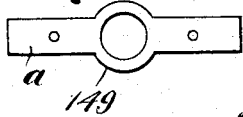
Figure 7:
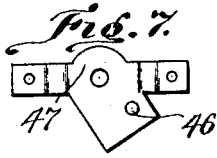
Figure 3:
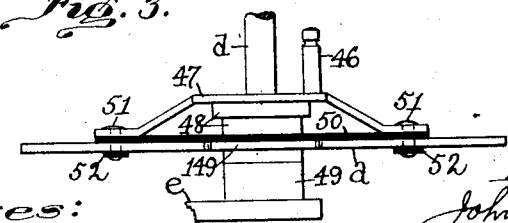
Figure 4:
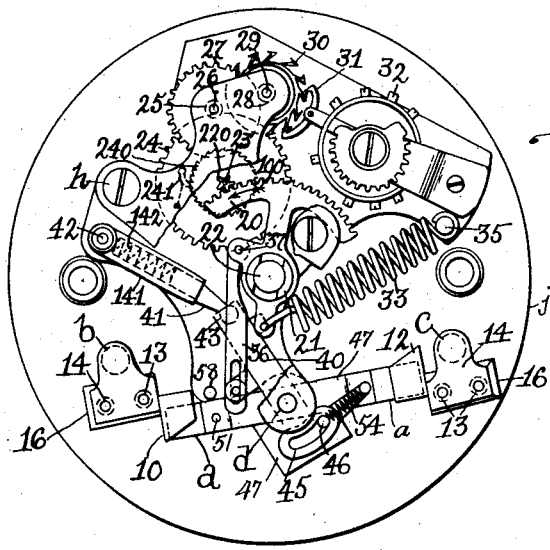
Figure 5:
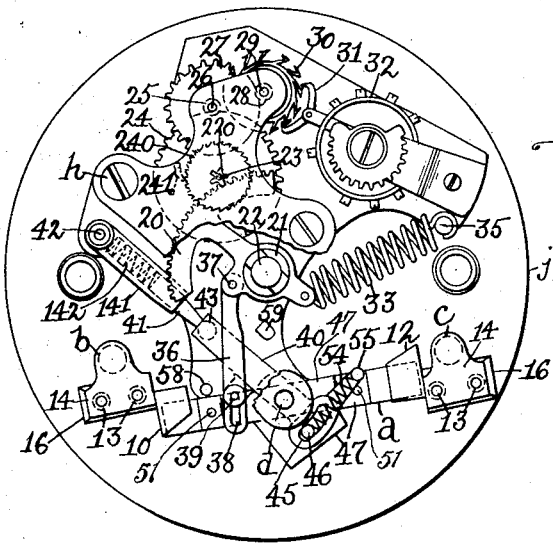

Figure 1 is an elevation with parts broken away of one form of circuit controller embodying this invention. Fig. 2, a plan view of the circuit controller shown in Fig. 1 with the inclosing casing or cover removed. Fig. 3, an enlarged detail to be referred to. Fig. 4, a view like Fig. 2 with the controller in its closed position. Fig. 5, a plan view to be referred to. Fig. 6, a plan of the movable contact member shown in Fig. 1, and Fig. 7, a plan of the carrier for the movable contact member shown in Fig. 6.

In the present instance I have shown one embodiment of the invention, in which $a$ represents the movable member of an electric circuit controller, and $b$, $c$, the fixed terminals or members with which the movable member $a$ coöperates. The member $a$ is loosely mounted on a stationary pivot pin or stud $d$ erected upon a metal plate $e$ and extended through a top plate $f$, which is spaced apart from the plate $e$ by posts $g$, erected upon the plate $e$ and to which the plate $f$ is secured by screws $h$. The plates $e$, $f$, constitute a framework for supporting the operating parts of the apparatus and it is suitably secured to a base $j$ of wood, rubber or other insulating material. The stationary members $b$, $c$, may be made as herein shown and consist of spring jaws or fingers 10, 12, which are secured by screws 13 to metal arms 14 on the terminal posts $b$, $c$, which extend through the base $j$ and to which the circuit wires (not shown) are secured. The screws 13 also serve to secure the arms 14 to non-metallic uprights 16 on the base $j$. The movable member $a$ of the switch or circuit controller is designed to be manually moved from its open position shown in Figs. 1 and 2 into its closed position shown in Figs. 4 and 5 with its opposite ends inserted between the spring jaws 10, 12 of the fixed terminals or members $b$, $c$, and after a predetermined lapse of time, said movable member is automatically disengaged from said terminals. In the present instance, I have shown one construction of mechanism for accomplishing these results, but I do not desire to limit the invention to the particular construction of mechanism herein shown.

The mechanism herein shown consists essentially of a segmental gear 20, fast on a hollow shaft or sleeve 21, mounted on an upright stud or post 22, supported by the framework $e$, $f$, said gear forming part of a motor mechanism comprising in the present instance a pinion 220 with which the segmental gear 20 meshes, a shaft 23 on which said pinion is fastened, a gear 24 loose on said shaft, a ratchet wheel 240 fast on the shaft 23 and a spring pressed pawl 241 carried by the gear 24 and engaging said ratchet wheel, a pinion 25 with which the gear 24 meshes, a shaft 26 on which the pinion 24 is fast, a gear 27 fast on the shaft 26, a pinion 28 with which the gear 27 meshes, a shaft 29 on which the pinion 28 is fast, an escape wheel 30 fast on the shaft 29, an escape lever 31 coöperating with the escape wheel 30, a spring actuated balance wheel 32 governing the action of said escape lever, and a main spring 33 for rotating the segmental gear 20 in the reverse direction to that in which it is moved by manual rotation of said segmental gear. In the present instance, the main spring 33 is shown as a helical spring having one end connected with the segmental gear and its other end connected with a post 35 erected upon the lower plate $e$ of the framework. The segmental gear 20 is operatively connected with the movable member *a* of the switch, which is effected as herein shown by a link or bar 36, pivotally connected at one end as at 37 to the segmental gear 20 and having its other end provided with a slot 38, through which extends a stud or pin 39 on a lever 40, mounted on the pivot pin or stud *d* for the movable member *a*. The lever 40 constitutes one member of a toggle, the other member of which is a lever comprising two members 41, 141, the member 141 being mounted on a post or pivot 42, erected upon the plate *e* of the framework, and provided with a socket for the reception of the member 41 and a helical spring 142 interposed between said members, the member 41 having at its free end a ball 43, which enters a socket in the end of the lever 40, see Figs. 2, 4 and 5. The opposite end of the lever 40 is provided with a curved slot 45, having the pivot *d* as a center, and through which extends a stud or pin 46, attached to a bridge piece or carrier 47 for the movable member *a*, see Figs. 1 and 3, said carrier being mounted on the pivot pin or stud *d* and fastened to a collar 48, loose thereon and resting on a fixed collar 49 on said pivot, stud or pin. The movable member *a* is insulated from the framework and the carrier 47, which is effected as shown by providing the member *a* with a center ring 149 of larger diameter than the collar 48, and by means of a layer 50 of insulation interposed between the carrier 47 and the said member, which latter is fastened to the carrier by screws 51, see Fig. 3, which are insulated from the member *a* by washers 52 of insulating material.

The switch is designed to be opened and closed with a quick movement of the member *a*, which is effected by the spring 142 of the toggle, and this spring may be assisted by a coiled spring 54, connecting a finger 55 on the lever 40 with the stud or pin 46 on the carrier 47, so that when the carrier 47 has been moved by the toggle-mechanism sufficiently to partially disengage the movable member *a* from the spring jaws 10, 12, the spring 54 will be placed under tension and will assist the spring 142 to effect the disengagement of said movable member *a* from the jaws 10, 12 substantially in an instant, thereby avoiding arcing between the member *a* and its coöperating terminals, or at least reducing to a minimum the danger of arc formations. The toggle lever 40 has coöperating with it studs or posts 58, 59, erected from the plate *e* and constituting stops to limit the movement of the toggle in opposite directions.

The operation of the circuit controller herein shown may be briefly described as follows. As represented in Fig. 2, the switch is shown in its open position, and to close the same the operator turns the hollow shaft 21 by means of a suitable handle or key 60, so as to turn the segmental gear 20 from substantially the position shown in Fig. 2 into substantially that shown in Fig. 4, or until the movable contact member *a* is engaged with the jaws 10, 12 of the fixed terminals *b*, *c*, and the circuit in which the switch is located is closed. As the gear 20 is turned from the position shown in Fig. 2 to that shown in Fig. 4, the link 36 acting on the pin 39 moves the toggle levers from the position shown in Fig. 2 on one side of a center line through their pivots to the other side thereof and into the position shown in Fig. 4. As the toggle lever 40 is turned on its pivot, it carries with it the stud or pin 46, and turns the movable member *a* on its pivot, and into engagement with the jaws 10, 12 of the fixed terminals, and at the same time the gear 20 stores up energy in the spring 33, which in the present instance is effected by elongating the same. As soon as the toggle levers 40, 41, 141 are moved beyond the center line, the spring 142 breaks or inclines the toggle with a quick motion and closes the switch substantially in an instant.

The operator releases the handle or key 60 as soon as the circuit is closed, and the latter remains in this condition a predetermined length of time, or until the switch is automatically opened by the main spring 33, which is not permitted to immediately open the switch, but is controlled by the escapement 30, 31, which regulates the action of the spring 33 on the segmental gear 20, so that a predetermined length of time elapses before the gear 20 moves the toggle levers 40, 41, 141 back into their starting position shown in Fig. 2. On the return movement of the segmental gear 20 under the influence of the spring 33, the toggle levers 40, 41, 141 are gradually moved by the link or bar 36 acting on the stud or pin 39, first into their straightened position shown in Fig. 5, and then beyond the center line through the pivots *d*, 42, and when the toggle levers have passed the center line, the spring 142 breaks or inclines the toggle levers and opens the switch substantially in an instant. As the toggle levers are moved from their inclined position shown in Fig. 4, to their straightened position shown in Fig. 5, it will be noticed that the slotted end of the lever 40 moves with relation to the stud or pin 46 and elongates the spring 54, so that on the continued return movement of the segmental gear in the direction indicated by the arrow 100, the opposite end wall of the slot 45 is engaged with the pin 46, and causes the toggle lever 40 to act on the pin 46 and start the opening movement of the contact member *a*, and at or about the time the toggle levers have been moved beyond the center line joining their pivots, the frictional contact of the member *a* with the jaws 10, 12 is overcome, and the said movable member is disengaged from said jaws substantially in an instant, so as to obtain a quick break in the circuit, by the spring 142 assisted by the spring 54 which moves the pin 46 to the other end of the slot 45 to open the circuit, and at the same time the toggle lever 46 is moved into engagement with its stop 58. The slot 38 in the link 36 also permits the contact member a to be engaged with the jaws 10, 12 of the fixed terminals with a quick motion and substantially in an instant, by the spring 142 after the toggle levers have been moved beyond the center.

It will be observed that in the construction herein shown, the switch is closed substantially in an instant, and that an interval of time elapses after the switch is closed before it is again opened, which arrangement is highly useful in many situations, as for instance, in the hallways of apartment houses, buildings, etc., where it is desired not to keep a hall lamp continuously lighted, but yet it is desirable to afford a light for the tenants. With the switch herein shown, it will be seen, that the hall can be lighted by each tenant, who pays no further attention to the light, which is cut out of circuit a predetermined length of time after the lamp is lighted.

I have herein shown one construction of apparatus embodying this invention, but I do not desire to limit the invention to the particular construction shown. So also I have shown the invention as embodied in a circuit controller which is manually closed and automatically opened by power, but I do not desire to limit my invention in this respect as it may be embodied in a circuit controller in which the closing of the circuit is effected by power.

The switch mechanism is protected by a suitable case 160, which may be secured to the base by screws 61, and through which the shaft 22 may be engaged by the key 60, which is inserted into the case through an opening therein. The key 60 is suitably shaped at its end to engage slots 63 in the upper end of the shaft 22. In the present instance the invention is shown as embodied in an electric switch or circuit controller, but it is not desired to limit the invention in this respect, as it may be embodied in an apparatus for controlling the flow of gas, water or the like in which case, the gas or water cock would correspond to the movable member a of the electric circuit controller.

The ratchet and pawl connection 240, 241, between the shaft 23 and the gear 24 enables the switch to be moved into its closed position by the operator without influencing the escapement mechanism, for when the shaft 22 is turned, the ratchet wheel 240 clicks by the pawl 241 and when the key 60 is released by the operator, the ratchet wheel 240 drives the gear 24 by means of the pawl 241.

Claims:

1. In a circuit controller, in combination, a movable contact member, a stud thereon, a lever having a slot through which said stud is extended, a spring connecting said stud and lever, a second lever pivotally connected with the slotted lever to form a toggle, a link having a pin and slot connection with the slotted lever of said toggle, a gear to which said link is connected, a rotatable shaft on which said gear is mounted, means for rotating said shaft in one direction, a spring motor to rotate said gear in the opposite direction, and a train of gears connected with the motor-operated gear to retard the movement of the same, substantially as described.

2. In a circuit controller, in combination, a movable contact member, stationary contact members coöperating therewith, toggle-levers connected with said movable contact member, a gear, means for connecting said gear with said toggle-levers, means for manually rotating said gear in one direction to close the switch, a spring for rotating said gear in the opposite direction to open the switch, and a clock mechanism for regulating the rotation of the said gear to delay the opening of the switch a predetermined length of time, substantially as described.

3. In a circuit controller, in combination, a movable member, a toggle-mechanism, means connecting said toggle-mechanism with said member to permit the latter to be moved by the toggle-mechanism and independently thereof, manually operated means connected with said toggle-mechanism to effect movement of the said member, a motor operatively connected with said toggle-mechanism to automatically effect movement of the toggle-mechanism, and means for regulating the movement of said toggle-mechanism by said motor, substantially as described.

4. In a circuit controller, in combination, a movable member, a toggle-mechanism, means connecting said toggle-mechanism with said movable member to permit the latter to be moved by the toggle-mechanism and independently thereof, manually operated means connected with said toggle-mechanism to effect movement of the said member in one direction and having provision for permitting the toggle-mechanism to move independently of the manually operated means, a motor operatively connected with said toggle-mechanism to automatically effect movement of the toggle-mechanism in the opposite direction, and means for regulating the movement of said toggle-mechanism by said motor, substantially as described.

5. In a circuit controller, in combination, a movable member, a toggle-mechanism, means connecting said toggle-mechanism with said member to permit the latter to be moved by the toggle-mechanism and independently thereof, means for effecting said independent movement, means connected with said toggle-mechanism to effect movement of the movable member into one position, a motor operatively connected with said toggle-mechanism to automatically move said toggle-mechanism into another position, and means for regulating the movement of said toggle-mechanism by said motor.

6. In a circuit controller, in combination, a movable member, means connected with said member for moving it into one position, a motor separate from said means and operatively connected with said movable member for automatically moving it into another position, and means for regulating the action of said motor to delay the movement of the movable member by said motor, and means for moving said movable member independently of said means and said motor, substantially as described.

In testimony whereof, I have signed my name to this specification in the presence of two subscribing witnesses.

JOHAN M. ANDERSEN.

Witnesses:
 JAS. H. CHURCHILL,
 J. MURPHY.

Copies of this patent may be obtained for five cents each, by addressing the "Commissioner of Patents, Washington, D. C."